United States Patent
Ahn et al.

(10) Patent No.: US 8,701,249 B2
(45) Date of Patent: Apr. 22, 2014

(54) HINGE DEVICE FOR A PORTABLE TERMINAL

(75) Inventors: Sung-Ho Ahn, Seoul (KR); Ji-Hoon Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/451,811

(22) Filed: Apr. 20, 2012

(65) Prior Publication Data
US 2012/0272481 A1    Nov. 1, 2012

(30) Foreign Application Priority Data

Apr. 26, 2011    (KR) .......................... 10-2011-0039241

(51) Int. Cl.
*E05D 11/10*    (2006.01)

(52) U.S. Cl.
USPC .................................. 16/330; 16/289; 16/326

(58) Field of Classification Search
USPC ........... 16/330, 303, 326, 329, 334, 386, 387;
361/679.08, 679.11, 679.02, 679.15,
361/679.27; 455/90.3, 575.1, 575.3, 575.8;
379/433.12, 433.13; 348/373, 333.01,
348/333.06, 794; 29/11; 200/181, 61.7
See application file for complete search history.

(56) References Cited

U.S. PATENT DOCUMENTS

| 803,747 | A * | 11/1905 | Elvin ......................... 384/190.2 |
| 6,948,217 | B2 * | 9/2005 | Higano et al. .................. 16/303 |
| 7,127,911 | B2 * | 10/2006 | Nam et al. ....................... 62/440 |
| 7,228,596 | B2 * | 6/2007 | Kang .............................. 16/330 |
| 7,346,960 | B2 * | 3/2008 | Higano et al. .................. 16/367 |
| 7,406,608 | B2 * | 7/2008 | Joshi ............................. 713/300 |
| 7,614,118 | B2 * | 11/2009 | Sato et al. ...................... 16/367 |
| 2006/0075603 | A1 * | 4/2006 | Hsieh ............................ 16/330 |
| 2007/0089273 | A1 * | 4/2007 | Kang ............................ 16/330 |

FOREIGN PATENT DOCUMENTS

FR    2771769 A1 *  6/1999

* cited by examiner

*Primary Examiner* — Chuck Mah
(74) *Attorney, Agent, or Firm* — Cha & Reiter, LLC

(57) ABSTRACT

A hinge device in a portable terminal is provided, in which a first driving cam is fixed to one end of a hinge shaft by a locking device, for rotating, a second driving cam is provided at the other end of the hinge shaft, for rotating together with the first driving cam and making a linear reciprocal motion along the hinge shaft, a driven cam is interposed between the first and second driving cams, for making a linear reciprocal motion along the hinge shaft as a cam motion with the first and second driving cams, and an elastic member is interposed between a hinge housing and the second driving cam.

9 Claims, 16 Drawing Sheets

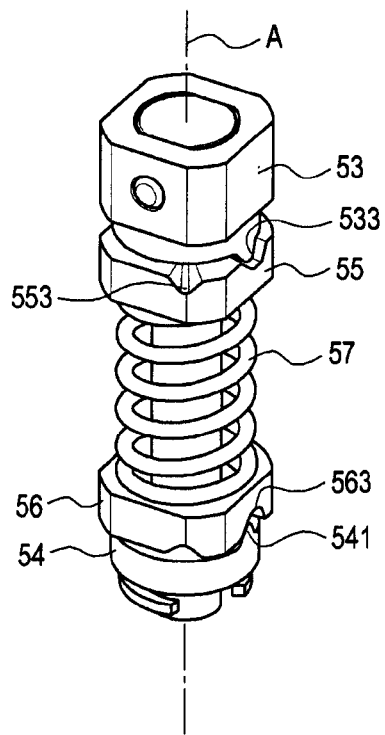
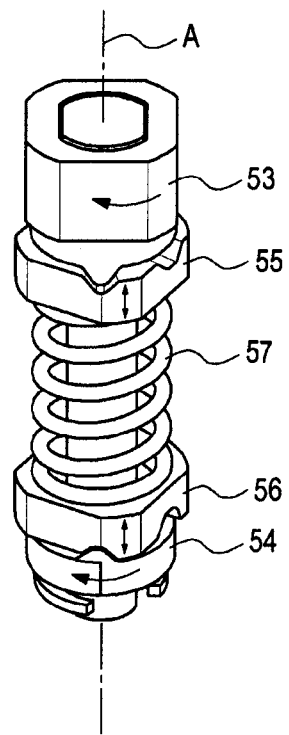
FIG.13A  FIG.13B
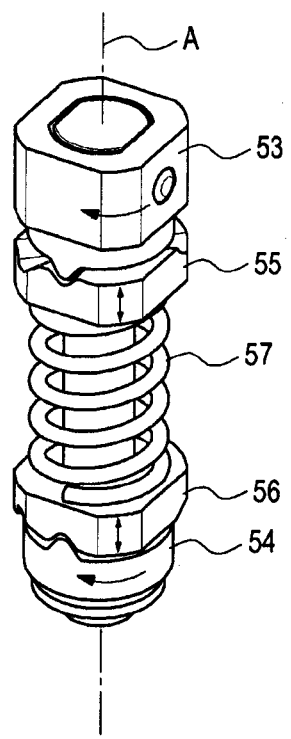
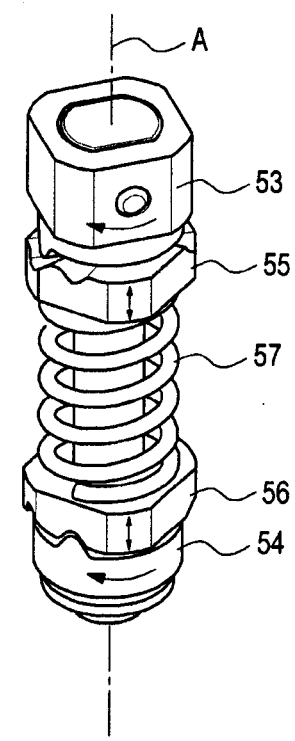
FIG.13C  FIG.13D

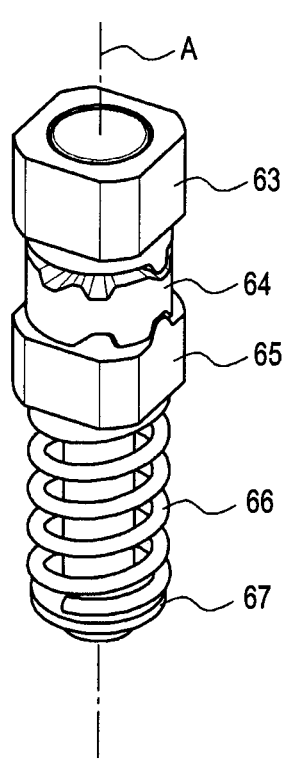
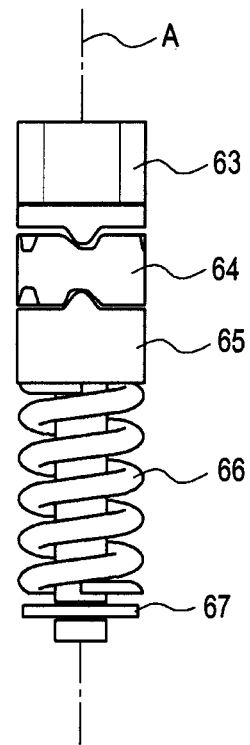
FIG.15        FIG.16
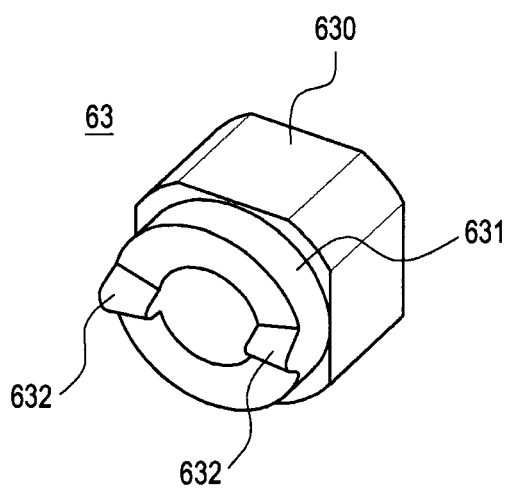
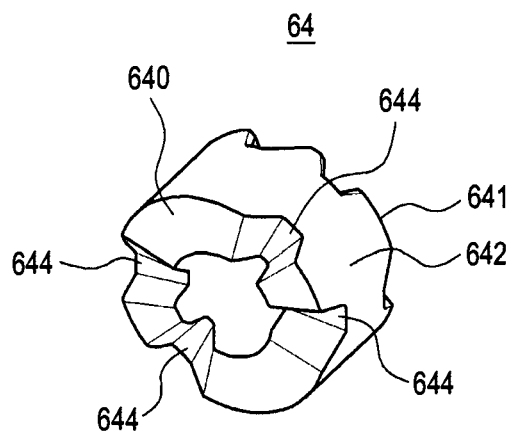
FIG.17A        FIG.17B

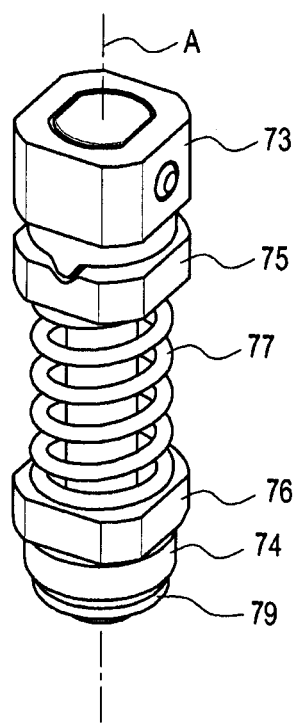
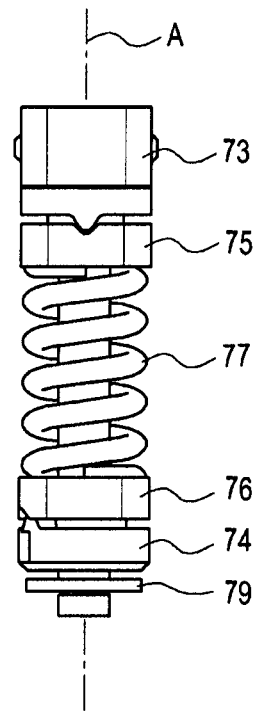
FIG.20　　　　　　FIG.21
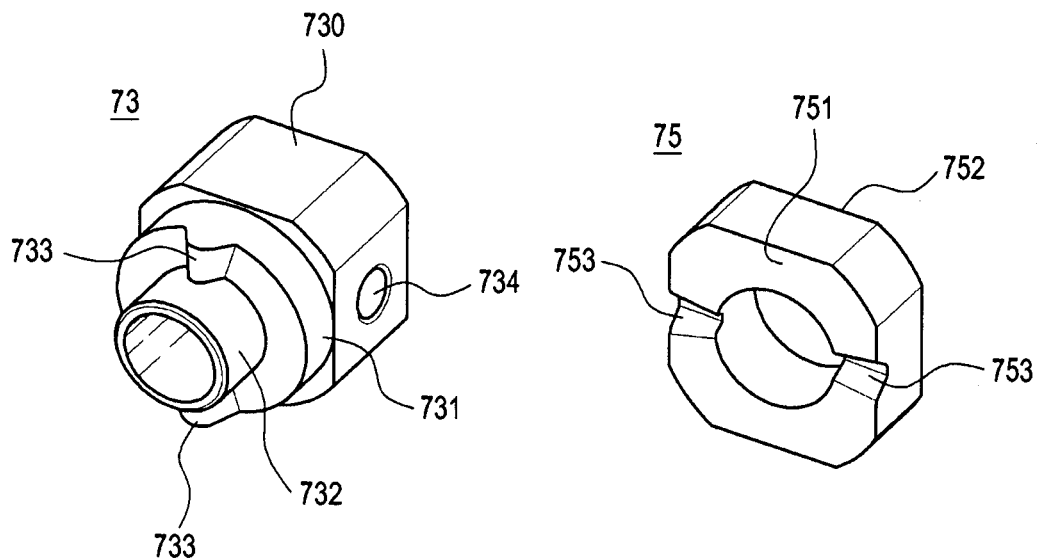
FIG.22A　　　　　　FIG.22B

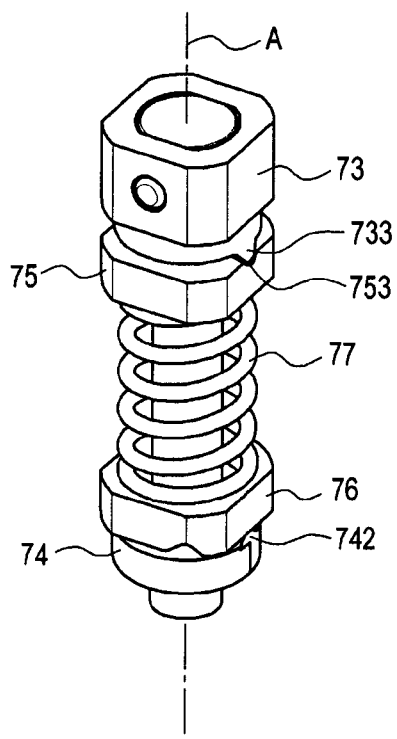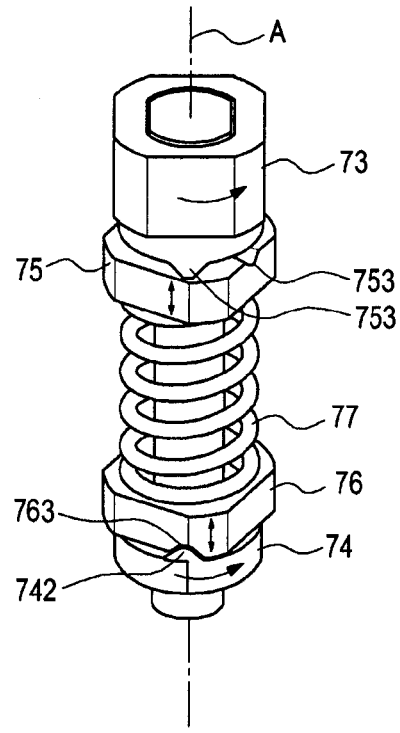
FIG.23A  FIG.23B
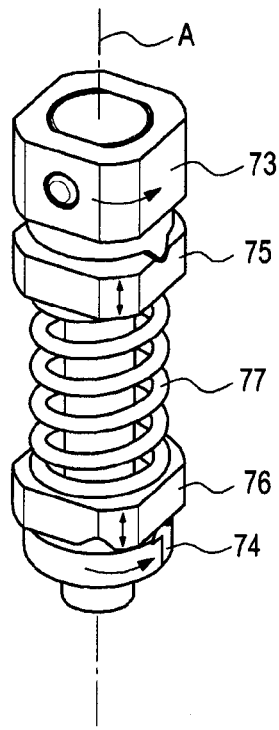
FIG.23C

HINGE DEVICE FOR A PORTABLE TERMINAL

CLAIM OF PRIORITY

This patent application claims priority under 35 U.S.C. §119(a) to a Korean Patent Application filed in the Korean Intellectual Property Office on Apr. 26, 2011 and assigned Serial No. 10-2011-0039241, the contents of which are herein incorporated herein by reference.

BACKGROUND OF THE INVENTION

1. Field

The present disclosure relates to a portable terminal, and more particularly, the present disclosure is directed to a hinge device for an access terminal.

2. Description of the Related Art

A portable terminal typically refers to a portable information device such as a cellular phone, a Personal Digital Assistant (PDA), a smart phone, a laptop computer, a tablet PC, etc. The portable terminal performs the functions of voice calls and message transmission and reception. Other more diverse functions are under development such as transmitting and receiving multimedia. For example, the portable terminal is being evolved to be capable of TV broadcasting, playing movies, and Internet browsing, etc.

Portable terminals can be categorized into a bar type, a folder type, and a sliding opening according to their outward appearance. A folder-type portable terminal is necessarily equipped with a hinge for opening and closing the phone.

The hinge device provides a stopping force to the portable terminal at a desired angle by cam members. The hinge also has a rotational axis. For instance, a laptop computer or a folder-type portable terminal necessarily includes a hinge device to rotatably connect two bodies to each other.

The folder-type portable terminal includes, for example, a body, a folder, and a hinge device for rotatably connecting the folder to the body. The hinge device has an elastic member and two cam members. The hinge device provides a closing force to the body when the folder is in a closed state. The hinge also provides a rotating force to the body at an angle equal to or smaller than a first rotation angle. The hinge also provides an opening force to the body at an angle larger than the first rotation angle, and a stopping force to the folder at a second rotation angle. At the second rotation angle, a user can conveniently view a display on the stationary folder member.

However, a conventional hinge device does not offer various stopping angles to a folding member and has limitations in satisfying users' demands. Moreover, repeated opening and closing operations reduce the lifetime of the hinge device.

Accordingly, there exists a need for a hinge device that provides various stopping angles for a folder and has an increased lifetime.

SUMMARY OF THE INVENTION

An aspect of embodiments of the present disclosure is to address at least the problems and/or disadvantages and to provide at least the advantages described below. Accordingly, an aspect of embodiments of the present disclosure is to provide a hinge device for stabilizing a large number of repeated opening and closing operations in a portable terminal.

Another aspect of embodiments of the present disclosure is to provide a hinge device for providing a stopping force to a second housing at various angles in a portable terminal.

In accordance with an embodiment of the present disclosure, there is provided a hinge device in a portable terminal. A hinge device adapted for a portable terminal, comprises a hinge housing and a hinge shaft located in the hinge housing and a cam member fit around the hinge shaft and having a plurality of cam members, wherein the plurality of cam members form a cam rotating motion; and an elastic member being around a portion of the hinge shaft, the elastic member for contacting the cams with each other. The hinge device has a first driving cam being fixed to an end of the hinge shaft by a locking device; and a second driving cam at a second end of the hinge shaft opposite the end, the first driving cam for rotating the second driving cam, the second driving cam for rotating together with the first driving cam and making a linear reciprocal motion along the hinge shaft; and a driven cam being between the first and second driving cams, the driven cam for making a linear reciprocal motion along the hinge shaft as a cam rotating motion with the first and second driving cams; and an elastic member being between the hinge housing and the second driving cam.

In accordance with another embodiment of the present disclosure, there is provided a hinge device in a portable terminal, including a hinge housing, a hinge shaft accommodated in the hinge housing, a cam member fit around the hinge shaft and having a plurality of cam members, and for making a cam motion, and an elastic member fit around the hinge shaft, and for closely contacting the cams with each other. In the cam member, a first cam member is provided at one end of the hinge shaft, a second cam member is provided at the other end of the hinge shaft, and an elastic member is disposed between the first and second cam members. The first and second cam members make a rotating cam motion, opposite to each other with respect to the elastic member.

In accordance with another embodiment of the present disclosure, there is provided a hinge device in a portable terminal, including a hinge housing, a hinge shaft accommodated in the hinge housing, a cam member fit around the hinge shaft and having a plurality of cam members, and for making a cam motion, and an elastic member fit around the hinge shaft, for closely contacting the cams with each other. In the cam member, a driving cam is provided at one end of the hinge shaft, and for rotating and a first driven cam faces the driving cam, the driven cam is for making a linear reciprocal motion along the hinge shaft or rotating around the hinge shaft, as a cam motion along with rotation of the first driving cam, a second driven cam faces the first driven cam, for making a linear reciprocal motion along the hinge shaft as a cam motion with the first driven cam, and an elastic member is interposed between the hinge housing and the second driven cam.

In accordance with a further embodiment of the present disclosure, there is provided a hinge device in a portable terminal, including a hinge housing, a hinge shaft accommodated in the hinge housing, a cam member fit around the hinge shaft and having a plurality of cam members, for making a cam motion, and an elastic member fit around the hinge shaft, for closely contacting the cams with each other. In the cam member, a driving cam is provided at one end of the hinge shaft, for rotating, a driven cam faces the driving cam, for making a linear reciprocal motion along the hinge shaft as a cam motion with the driving cam, and an elastic member is placed between the hinge housing and the driven cam. The driving cam has a single cam protrusion and the driven cam has a plurality of cam recesses.

BRIEF DESCRIPTION OF THE DRAWINGS

The above features and advantages of certain embodiments of the present disclosure will be more apparent from the following detailed description taken in conjunction with the accompanying drawings, in which:

FIG. 13A is a perspective view illustrating an operation of the hinge device illustrated in FIG. 9, when the second housing is at a rotation angle of 0°;

FIG. 13B is a perspective view illustrating an operation of the hinge device illustrated in FIG. 9, when the second housing is at a rotation angle of 60°;

FIG. 13C is a perspective view illustrating an operation of the hinge device illustrated in FIG. 9, when the second housing is at a rotation angle of 180°;

FIG. 13D is a perspective view illustrating an operation of the hinge device illustrated in FIG. 9, when the second housing is at a rotation angle of 220°;

FIG. 15 is an assembled perspective view of the hinge device illustrated in FIG. 14 free of a hinge housing;

FIG. 16 is a front view of the hinge device illustrated in FIG. 15;

FIG. 17A is a perspective view of a driving cam in the hinge device illustrated in FIG. 14;

FIG. 17B is a perspective view of a driven cam in the hinge device illustrated in FIG. 14;

FIG. 20 is an assembled perspective view of the hinge device illustrated in FIG. 19, and when the hinge device does not have a hinge housing;

FIG. 21 is a front view of the hinge device illustrated in FIG. 20;

FIG. 22A is a perspective view of a driving cam in the hinge device illustrated in FIG. 19;

FIG. 22B is a perspective view of a driven cam in the hinge device illustrated in FIG. 19;

FIG. 23A is a perspective view illustrating an operation of the hinge device illustrated in FIG. 19, and when the second housing is at a rotation angle of 0°;

FIG. 23B is a perspective view illustrating an operation of the hinge device illustrated in FIG. 19, and when the second housing is at a rotation angle of 130°;

FIG. 23C is a perspective view illustrating an operation of the hinge device illustrated in FIG. 19, and when the second housing is at a rotation angle of 180°;

Throughout the drawings, the same drawing reference numerals will be understood to refer to the same elements, features and structures.

DETAILED DESCRIPTION

Reference will now be made in detail to the preferred embodiments of the present disclosure with reference to the accompanying drawings. The following description is given only of components and/or operations required to understand the present disclosure and the other background art will not be described lest it should make the subject matter of the present disclosure obscure.

Figure 1:
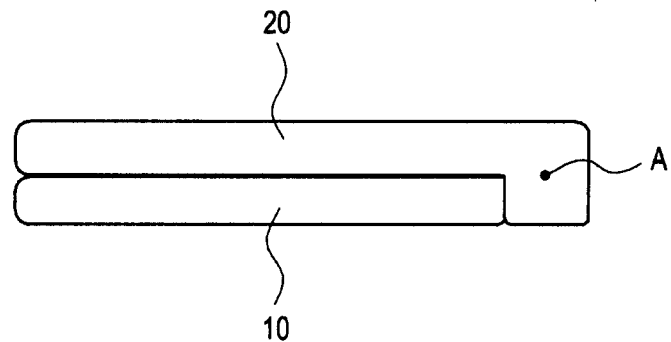
FIG. 1 is a side view of a portable terminal having a hinge device in a closed state according to the present disclosure.
Figure 2:
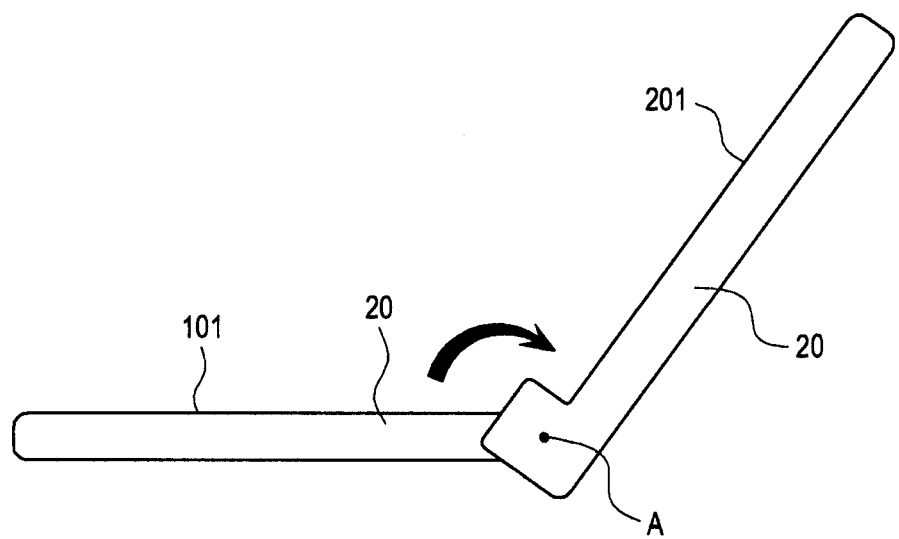
FIG. 2 is a side view of the portable terminal having the hinge device in an open state according to the present disclosure.
Figure 3:
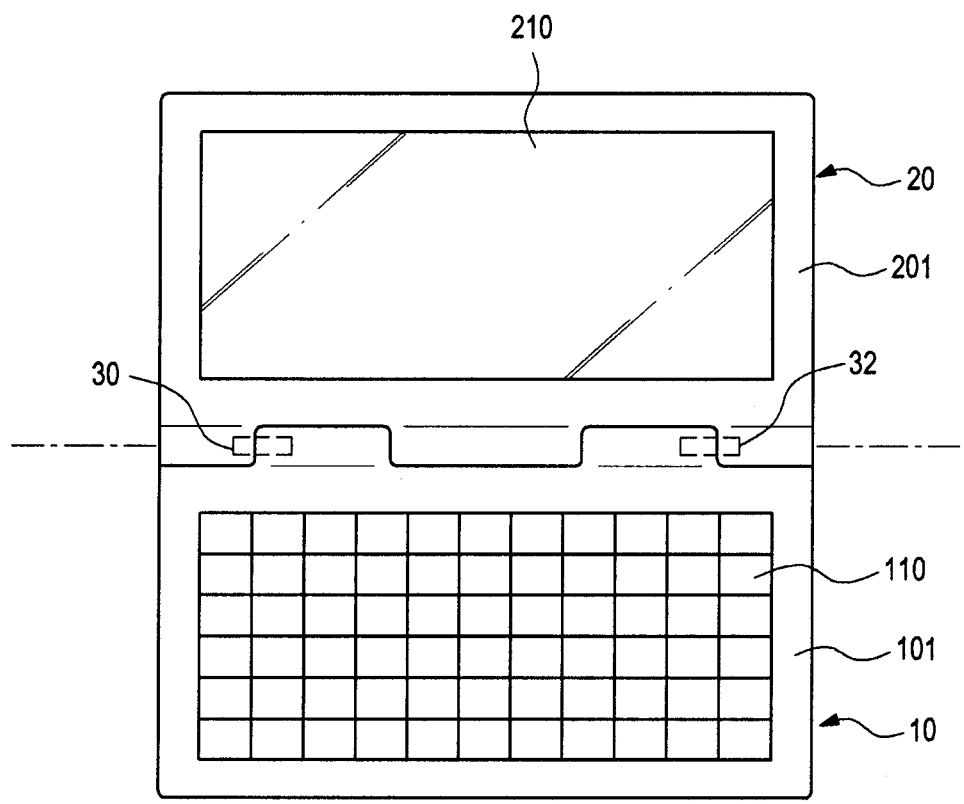
FIG. 3 is a plan view of the portable terminal having the hinge device in the open state according to the present disclosure.

FIGS. 1, 2 and 3 illustrate a portable access terminal having a hinge device in open and closed positions. Referring to FIGS. 1, 2 and 3, the portable terminal includes a first housing 10, a second housing 20, and a hinge device. The hinge device is for engaging the second housing 20 with the first housing 10 in such a manner that the second housing 20 may rotate with respect to the first housing 10 upon a hinge axis A. An information input unit/information Input/Output (I/O) unit 110 is provided on an inner surface 101 of the first housing 10.

The terminal also has an information output unit/information I/O unit 210 is provided on an inner surface 201 of the second housing 20. The information input unit may include a QWERTY keypad and the information output unit may also include a Liquid Crystal Display (LCD) or an Active Matrix Organic Light Emitting Diode (AMOLED) display. The information I/O unit includes a touch screen.

The hinge device includes a hinge module 30, a hinge dummy 32, and a plurality of hinge arms. Among them, two hinge arms are provided at the side of the first housing 10 and three hinge arms at the side of the second housing 20. The hinge module 30 and the hinge dummy 32 are disposed respectively at the sides on the hinge axis A. The hinge module 30 should provide a force to maintain the second housing 20 closed when the second housing 20 is closed. Hinge module 30 also provides an opening force to the second housing 20 at an angle equal to or larger than a first rotation angle or smaller than a second rotation angle. Hinge module 30 also provides a stopping force to the second hosing 20 at the second rotation angle. Second rotation angles are also possible. For instance, the hinge module 30 may provide the stopping force to the second housing 20 at 60°, 120°, 180°, 220° etc. Angles at which the stopping force is provided to the second housing 20 after rotation may vary depending on the positions of protrusions and cam recesses formed on cams, which will be described herein.

Now a detailed description will be given of various configurations for a hinge device used as the hinge module of the portable terminal, with reference to FIGS. 4 to 27B.

Figure 4:
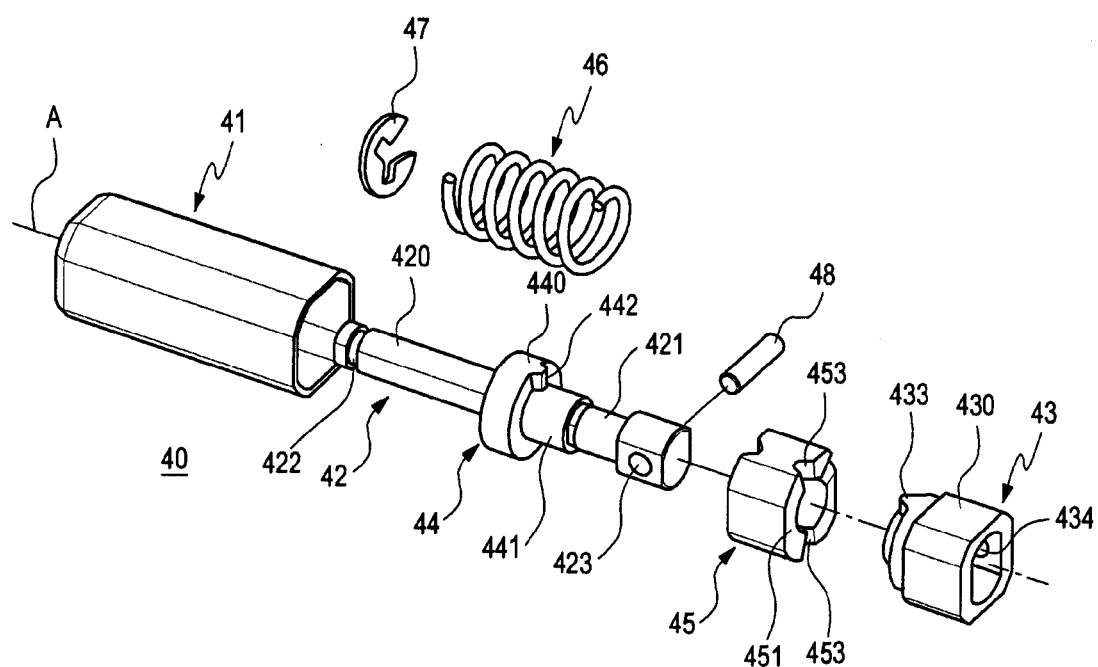
FIG. 4 is an exploded perspective view of a hinge device according to an embodiment of the present disclosure.
Figure 5:
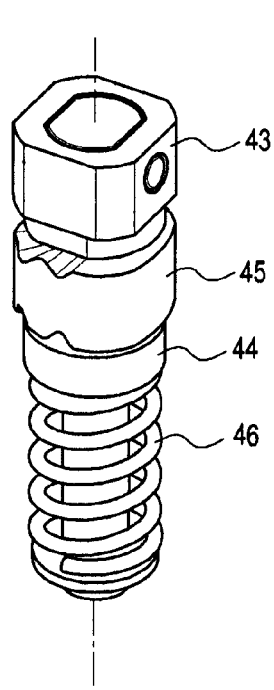
FIG. 5 is an assembled perspective view of the hinge device without a hinge housing according to the embodiment of the present disclosure.
Figure 6:
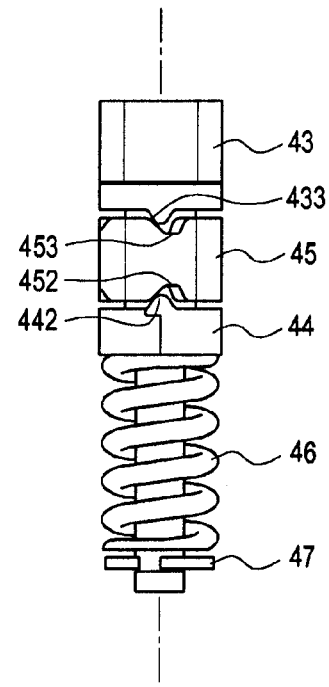
FIG. 6 is a front view of the hinge device illustrated in FIG. 5.

With reference to FIGS. 4 to 7B, the configuration of a hinge device 40 for a portable terminal according to an embodiment of the present disclosure will be described in detail. Referring to FIGS. 4, 5 and 6, the hinge device 40 includes a hinge housing 41, a hinge shaft 42, and a cam member including two or more cams (i.e. first and second driving cams and a driven cam) 43, 44 and 45, and an elastic member 46.

The hinge housing 41 includes a part of the hinge shaft 42, a part of the cam member (the second driving cam and the driven cam) 44 and 45, and an elastic member 46 being shown along the hinge axis A. With these components accommodated in the hinge housing 41, the elastic member 46 is tensioned within the hinge housing 41. Also, the second driving cam 44 through which the hinge shaft 42 is inserted rotates along with rotation of the later-described first driving cam 43, and the driven cam 45 moves back and forth linearly along the hinge shaft 42 along with the rotation of the first and second driving cams 43 and 44.

The hinge shaft 42 is inserted into the first and second driving cams 43 and 44, the driven cam 45, and the elastic member 46. The hinge shaft 42 is divided into two portions, or portion 420 and portion 421. The elastic member 46, the second driving cam 44, and the driven cam 45 are positioned roughly in one portion 420 of the hinge shaft 42. The first driving cam 43 is fixed roughly in the other area 421 of the hinge shaft 42. A fastening groove 422 is formed at one end of the one area 420. The fastening groove 422 is for engaging with a fastener such as an E-ring 47. In one embodiment, one area 420 is cut into a D shape along its outer circumference. A D-cut portion and a hole 423 through which a locking pin 48 is inserted are formed. In one embodiment, the D cut portion and hole are located at the other end of the other portion 421 of the hinge shaft 42.

The elastic member 46 fits around the one area 420 of the hinge shaft 42. The elastic member 46 is for providing a force to bring the first and second driving cams 43 and 44 into close contact with the driven cam 45 and thus enabling a cam rotating motion. One end of the elastic member 46 closely contacts one side surface of the hinge housing 41. The other end of the elastic member 46 closely contacts the second driving cam 44. The elastic member 46 fits around the one area 420 of the hinge shaft 42. The elastic member 46 is compressed or pulled inside the hinge housing 41 in contact on the cam member and moves with the cam motion of the cam member. The elastic member 46 may be a compressed coil spring.

The cam member includes the first and second driving cams 43 and 44 and the single driven cam 45. The first and second driving cams 43 and 44 refer to cams that rotate along with rotation of the second housing. The driven cam 45 refers to a cam that moves back and forth along the hinge shaft 42 and moves with the rotation of the first and second driving cams 43 and 44.

Figure 7A:
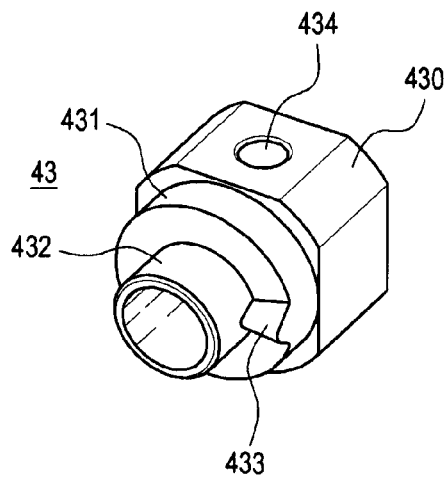
FIG. 7A is a perspective view of a driving cam in the hinge device according to the embodiment of the present disclosure.

Referring to FIGS. 4 and 7A, the first driving cam 43 is locked to the an end of the hinge shaft 42 by a locking device. As the first driving cam 43 is fixed to the second housing illustrated in FIG. 3 and as shown as outside the hinge housing 41 as illustrated in FIGS. 5 and 6, the first driving cam 43 rotates along with rotation of the second housing. The first driving cam 43 is a hollow member. The first driving cam 43 also is shown as at an end of the hinge shaft 42, driving cam 43 is inserted into an inner space. As stated before, the first driving cam 43 is fixed to an end of the hinge shaft 42 by the locking device. The locking device includes the locking pin 48, a first locking opening 434 formed into the first driving cam 43. The locking pin 48 is inserted in the opening 434. The locking device also has a second locking opening 423 at the other end of the hinge shaft 42, through which the locking pin 48 is inserted. The two locking openings 434 and 423 are open in a relatively perpendicular manner relative to the hinge axis A. When the locking pin 48 is inserted into the two locking openings 434 and 423, the first driving cam 43 is fixed to the other end of the hinge shaft 42.

The first driving cam 43 includes a cam body 430, and a first hollow portion 431 protruding from one surface of the cam body 430 along the hinge axis A. The first driving cam 43 also has a second hollow portion 432 protruding from the first hollow portion 431 along the hinge axis A and having a smaller diameter than the first hollow portion 431. The cam body 430, the first hollow portion 431, and the second hollow portion 432 are integrally formed relative to one another. The second hollow portion 432 is oriented to the first hollow portion 431. A single cam protrusion 433 is formed on one surface of the first hollow portion 431 that faces the driven cam 45 and creates a rotating or a rotating cam motion. The single cam protrusion 433 is shaped and extends from the outer circumference toward the center on the one surface of the first hollow portion 431 so that the single cam protrusion 433 meets the outer circumferential surface of the second hollow portion 432.

The second driving cam 44 includes a cam body 440 and a hollow portion 441. Hollow portion 441 extends from one surface of the cam body 440 along the hinge axis A. Along with rotation of the second housing, the second driving cam 44 rotates with the first driving cam 43. The second driving cam 44 is fixed in the one area 420 of the hinge shaft 42 and is configured to move back and forth along the length of the hinge shaft 42. To make a back and forth motion, the second driving cam 44 is hollow and an inner space is shaped relative with an area 420 of the hinge shaft 42. With the one area 420 of the hinge shaft 42 being inserted into the second driving cam 44, the second driving cam 44 can move back and forth along the length of the hinge shaft 42. Second driving cam 44 thus rotates along with rotation of the hinge shaft 42. A single cam protrusion 442 is formed on the one surface of the cam body 440 of the second driving cam 44. The single cam protrusion 442 has a similar shape and the single cam protrusion 433 of the first driving cam 43 may extends from the outer circumference of the cam body 440 toward the center of the cam body 440. The single cam protrusion 442 of the second driving cam 44 forms a rotating cam motion together with the single cam protrusion 433 and faces the single cam protrusion 433.

Figure 7B:
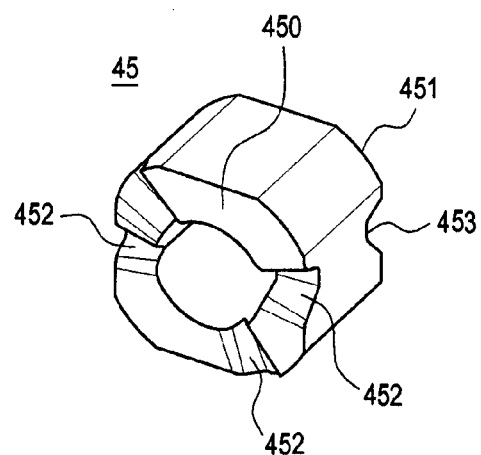
FIG. 7B is a perspective view of a driven cam in the hinge device according to the embodiment of the present disclosure.

Referring to FIGS. 4 and 7B, the driven cam 45 is a cam member disposed between the first and second driving cams 43 and 44. The driven cam 45 is for making a cam motion. The driven cam 45 is hollow. One cam surface 451 of the driven cam 45 faces the first driving cam 43, while the other cam surface 450 of the driven cam 45 faces the second driving cam 44. As the driven cam 45 is formed into a hollow cylinder, the hinge shaft 42 is inserted into the driven cam 45. Thus, along with rotation of the first and second driving cams 43 and 44, the driven cam 45 moves back and forth linearly along the length of the hinge shaft 42. First cam recesses 453 are formed on the one cam surface 453 of the driven cam 45. Recesses 453 create a rotating cam motion with the single cam protrusion 433 of the first driving cam 43. A plurality of second cam recesses 452 are formed on the other cam surface 450 of the driven cam 45 to create a cam rotating motion with the single cam protrusion 442 of the second driving cam 44. While the first and second cam recesses 453 and 452 are formed into the same shape, and generally disposed opposite to each other, other shapes are possible to provide various opening and closing angles for the second housing.

Referring to FIGS. 5 and 6, when the components of the hinge device are connected in the hinge housing by a fastener, for example, the E-ring 47, then the driven cam 45 is disposed between the first and second driving cams 43 and 44, and in close contact by the elastic member 46. The first driving cam 43 is disposed outside the hinge housing.

FIG. 6 illustrates the hinge device, when the portable terminal is in a closed state. Referring to FIG. 6, the single cam protrusions 433 and 442 are roughly half placed and, not fully, placed in selected cam recesses 453 and 452 of the driven cam 45, in order to provide a force to maintain the second housing closed to the first housing to a predetermined degree.

Figure 8A:
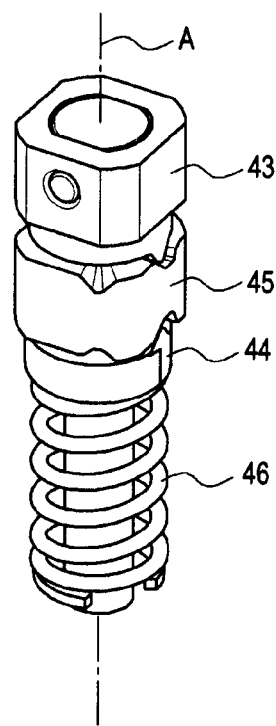
FIG. 8A is a perspective view illustrating an operation of the hinge device according to the embodiment of the present disclosure, when a second housing is at a rotation angle of 0°.

With reference to FIGS. 8A to 8D, operations of the hinge device will be described in great detail. FIG. 8A illustrates an operation of the hinge device when the portable terminal is in the closed state. In this embodiment, the second housing of the portable terminal (illustrated in FIGS. 1, 2 and 3), specifically the first and second driving cams 43 and 44 are at a rotation angle of 0 degrees. When the second housing rotates by 60° and as illustrated in FIG. 8A, the first and second driving cams 43 and 44 simultaneously rotate together, thereby placing the hinge device in the position illustrated in FIG. 8B. In addition, the single cam protrusions 433 and 442 of the first and second driving cams 43 and 44 move to adjacent cam recesses of the driven cam 45 and then are fully placed in the selected cam recesses of the driven cam 45. Thus, a stopping force is applied to the second housing at the angle of about 60°, maintaining the second housing in a stationary manner. Therefore, the first and second driving cams 43 and 44 and the driven cam 45 are also fixed.

Figure 8B:
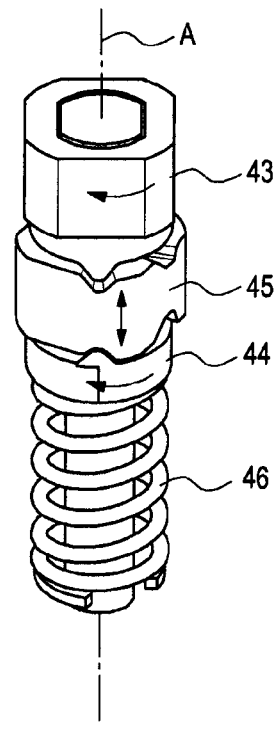
FIG. 8B is a perspective view illustrating an operation of the hinge device according to the embodiment of the present disclosure, when the second housing is at a rotation angle of 60°.
Figure 8C:
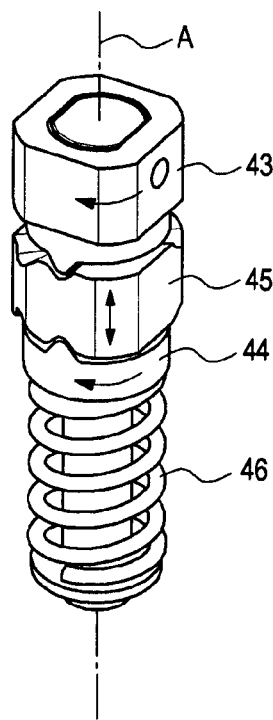
FIG. 8C is a perspective view illustrating an operation of the hinge device according to the embodiment of the present disclosure, when the second housing is at a rotation angle of 180°.
Figure 8D:
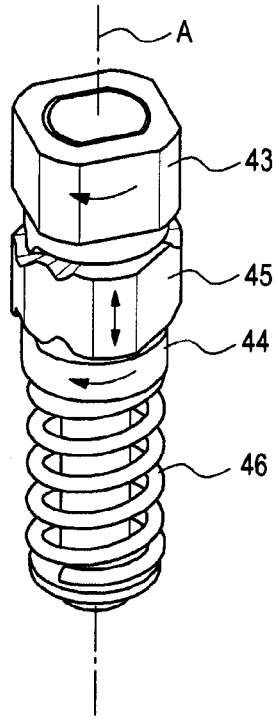
FIG. 8D is a perspective view illustrating an operation of the hinge device according to the embodiment of the present disclosure, when the second housing is at a rotation angle of 220°.

When the second housing is further rotated by 120° in the position of FIG. 8B, then the hinge device is placed in the position illustrated in FIG. 8C. The hinge device as illustrated in FIG. 8C is rotated from the position of FIG. 8A by about 180 degrees. The single cam protrusions 433 and 442 of the first and second driving cams 43 and 44 are fully inside and within in cam recesses opposite to the cam recesses of the driven cam 45 illustrated in FIG. 8A. If the first and second driving cams 43 and 44 further rotate by 40° in the position of FIG. 8C, the hinge device is placed in the position illustrated in FIG. 8D. That is, the hinge device illustrated in FIG. 8D is an about 220-degree rotated version of the hinge device relative to the view illustrated in FIG. 8A. In this position, the single cam protrusions 433 and 442 of the first and second driving cams 43 and 44 are fully placed in cam recesses of the driven cam 45. In the above operations of the hinge device, the driven cam 45 moves back and forth in a reciprocal motion along the hinge axis A and the elastic member 46 is compressed or pulled, according to rotation of the first and second driving cams 43 and 44. The second driving cam 44 also moves back and forth along the hinge axis A.

As stated before, a stopping force may be provided. This forced may be applied to the second housing during rotation of the second housing at various predetermined angles depending on the positions of the single cam protrusions 433 and 442 or the positions of the cam recesses 452 and 453 of the driven cam 45. During a cam rotating motion by the hinge device, the first and second driving cams 43 and 44 are symmetrically disposed with respect to the driven cam 45, and these cam members 43, 44 and 45 may form a rotating or cam motion. Thus, the cam members 43, 44 and 45 can stably operate and the lifetime of the hinge device can be long.

The hinge device 40 may provide a stopping force to the second housing at 0° (closed state) and 180 degrees. The hinge device 40 may provide a stopping force to the second housing at 0°, 60°, and 180°, at 0°, 70°, and 210°, or at 0°, 60°, 180°, and 220° according to the relative positions of the cam protrusions 433 and 442 and the cam recesses 452 and 453. The stopping force may be provided to the second housing at more various predetermined rotation angles by changing the positions of the cam protrusions 433 and 442 and the cam recesses 452 and 453.

Figure 9:
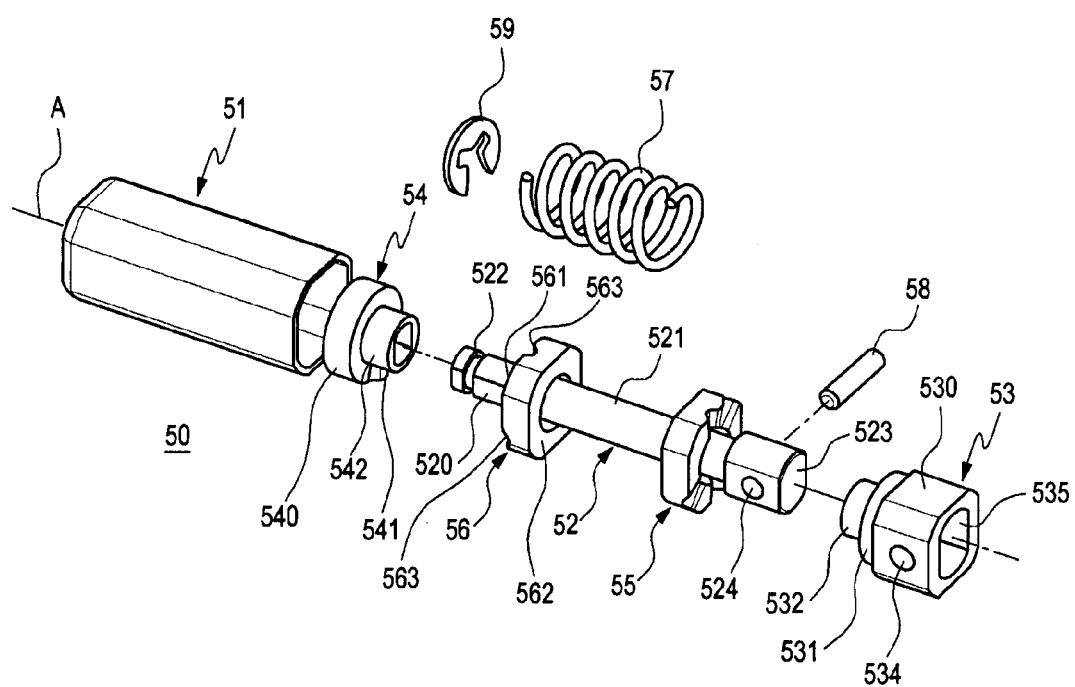
FIG. 9 is an exploded perspective view of a hinge device according to another embodiment of the present disclosure.
Figure 10:
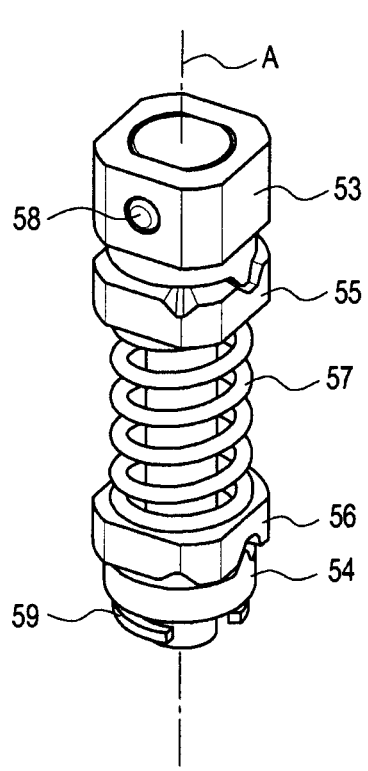
FIG. 10 is an assembled perspective view of the hinge device illustrated in FIG. 9 free of a hinge housing.
Figure 11:
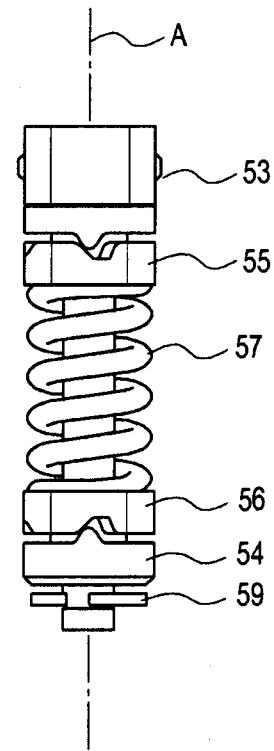
FIG. 11 is a front view of the hinge device illustrated in FIG. 10.

With reference to FIGS. 9 to 12B, the configuration of a hinge device 50 for a portable terminal according to another embodiment of the present disclosure will be described in detail. Referring to FIGS. 9, 10 and 11, the hinge device 50 includes a hinge housing 51, a hinge shaft 52, a cam portion including three or more cams (first and second driving cams and first and second driven cams) 53, 54, 55 and 56. Hinge device also has and an elastic member 57. More particularly, the hinge device 50 has a first cam portion at one side of the elastic member 57 and a second cam portion at the other side of the elastic member 57. The first and second cam members are disposed generally opposite to each other with respect to the elastic member 57. The first cam portion includes the first driving cam 53 and the first driven cam 55. The second cam unit also includes the second driving cam 54 and the second driven cam 56.

The hinge housing 51 forms a part of the hinge shaft 52, and parts of the cam members (the second driving cam and the first and second driven cams) 54, 55 and 56, and also has the elastic member 57 along the hinge axis A. With these components accommodated in the hinge housing 51, the elastic member 57 is compressed or pulled within the hinge housing 51. The second driving cam 54 is disposed through the hinge shaft 52 and when inserted rotates along with rotation of the later-described first driving cam 53. The first and second driven cams 55 and 56 move back and forth in a linear reciprocal motion along the hinge shaft 52 and along with the rotation of the first and second driving cams 53 and 54.

The hinge shaft 52 is inserted into the first and second driving cams 53 and 54. Hinge shaft 52 also may be inserted into the first and second driven cams 55 and 56, and the elastic member 57. The hinge shaft 52 is divided into two portions 520 and 521. The second driving cam 54 is positioned roughly in the one portion 520 of the hinge shaft 52. The second driving cam 54 is also position relative to the second driven cam 56, the elastic member 57. The first driven cam 55, and the first driving cam 53 are positioned roughly in the other portion 521 of the hinge shaft 52. A fastening groove 522 is formed at one end of the one area 520 of the hinge shaft 52. Groove 522 may be for engaging with a fastener such as an E-ring 59 and the one area 520 of the hinge shaft 52 is cut into a D shape along its outer circumference. The other area 521 of the hinge shaft 52 is cylindrical. In one embodiment, a D-cut portion and a hole 523 through which a locking pin 58 is inserted are formed at the other end 523 of the other area 521 to which the first driving cam 53 is fixed.

The elastic member 57 fits around the other area 521 of the hinge shaft 52, and the elastic member 57 may be for supplying a force to bring the first and second driving cams 53 and 54 into close contact with the first and second driven cams 55 and 56 and enabling a cam rotating motion. One end of the elastic member 57 closely contacts one side surface of the hinge housing 51, whereas the other end of the elastic member 57 contacts the first driven cam 55. Fitting around the other area 521 of the hinge shaft 52 is the elastic member 57. Elastic member 57 may be compressed or pulled inside the hinge housing 51 in relation to the cam motion of the cam members. The elastic member 57 may be a compressed coil spring.

The first cam member includes the first driving cam 53 and the first driven cam 55, and the second cam member includes the second driving cam 54 and the second driven cam 56. The first and second driving cams 53 and 54 refer to cams that rotate along with rotation direction of the second housing. As illustrated in FIGS. 1, 2, and 3, and the first and second driven cams 55 and 56 show cams that move back and forth along the hinge shaft 52 during rotation of the first and second driving cams 53 and 54.

Figure 12A:
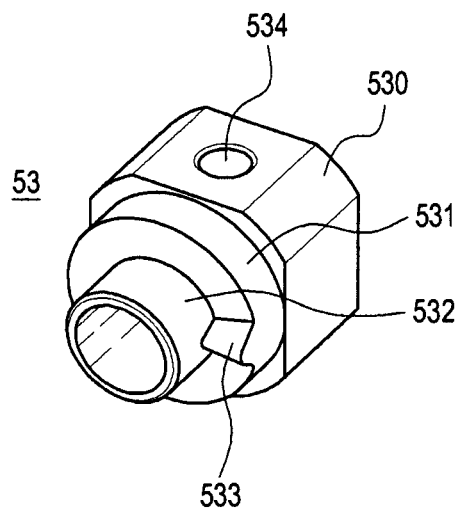
FIG. 12A is a perspective view of a driving cam in the hinge device illustrated in FIG. 9.

Referring to FIGS. 9 and 12A, the first driving cam 53 is fixed to the end 523 of the hinge shaft 52 by a locking device. As the first driving cam 53 is fixed to the second housing illustrated in FIG. 3 and being outside the hinge housing 51 as illustrated in FIGS. 10 and 11, and the first driving cam 53 rotates along with rotation of the second housing. The first driving cam 53 is hollow and the other end 523 of the hinge shaft 52 is inserted into the inner space 535 of the first driving cam 53. As stated before, the first driving cam 53 is fixed to the other end 523 of the hinge shaft 52 by the locking device. The locking device includes the locking pin 58, and a first locking opening 534. Locking opening 534 is formed into the first driving cam 53, and through which the locking pin 58 is inserted, and a second locking opening 524 is shown at the other end 523 of the hinge shaft 52, through which the locking pin 58 is inserted. The two locking openings 534 and 524 are open in generally perpendicular to the hinge axis A. When the locking pin 58 is inserted into the two locking openings 534 and 524, then the first driving cam 53 is locked to the other end 523 of the hinge shaft 52.

The first driving cam 53 includes a cam body 530, a first hollow portion 531, which protrudes from one surface of the cam body 530 along the hinge axis A. Cam 53 also has a second hollow portion 532 protruding from the first hollow portion 531 and along the hinge axis A. Portion 532 also has a smaller diameter than the first hollow portion 531. The cam body 530, the first hollow portion 531, and the second hollow portion 532 are integrally formed relative to one another. The second hollow portion 532 is arranged relative to the first hollow portion 531. A single cam protrusion 533 is formed on one surface of the first hollow portion 531 and faces the first driven cam 55. Protrusion 533 is for creating a cam rotating motion. The single cam protrusion 533 is shaped into a predetermined shape and may, extend from the outer circumference toward the center on the one surface of the first hollow portion 531. In this manner, the single cam protrusion 533 contacts the outer circumferential surface of the second hollow portion 532.

The second driving cam 54 includes a cam body 540 and a hollow portion 542. The portion 542 extends from one surface of the cam body 540 along the hinge axis A. Along with rotation of the second housing, the second driving cam 54 rotates with the first driving cam 53. The second driving cam 54 is fixed in a predetermined area 520 of the hinge shaft 52. Cam 54 has an inner space being formed with the one area 520 of the hinge shaft 52. That is, with the one area 520 of the hinge shaft 52 inserted into the second driving cam 54, the second driving cam 54 rotates along with rotation of the hinge shaft 52, and in contact with a surface of the hinge housing. A single cam protrusion 541 is formed on the one surface of the cam body 540 of the second driving cam 54. The single cam protrusion 541 has a similar shape as the single cam protrusion 533 of the first driving cam 53, and may extend from the outer circumference of the cam body 540 being in a direction toward the center of the cam body 540. The single cam protrusion 541 of the second driving cam 54 form a rotating cam motion with the single cam protrusion 533, which also faces the protrusion 533.

Figure 12B:
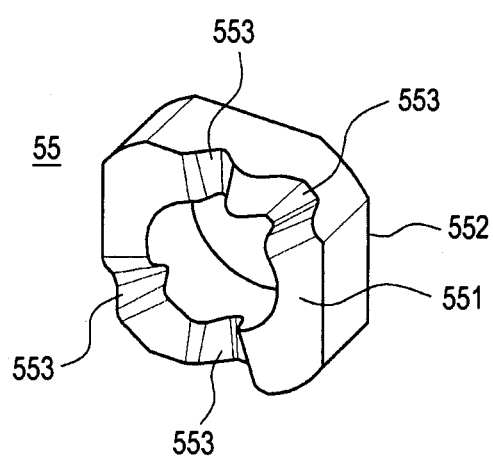
FIG. 12B is a perspective view of a driven cam in the hinge device illustrated in FIG. 9.

Referring to FIGS. 9 and 12B, the first and second driven cams 55 and 56 are cam members having a similar shape and are disposed between the first and second driving cams 53 and 54. The cam members may form a rotating motion with the first and second driving cams 53 and 54.

The first driven cam 55 is disposed between the first driving cam 53 and the elastic member 57, and faces the first driving cam 53, and may form a rotating motion. The first driven cam 55 is hollow. One cam surface 551 of the first driven cam 55 faces the first driving cam 53, while the other cam surface 552 of the first driven cam 55 faces the elastic member 57. As the first driven cam 55 is shaped into a hollow cylinder, the hinge shaft 52 is inserted into the first driven cam 55. Thus, along with rotation of the first driving cam 53, the first driven cam 55 moves back and forth in a linear reciprocal motion along the length of the hinge shaft 52. Cam recesses 553 are formed on the one cam surface 551 of the first driven cam 55 to create a cam motion with the single cam protrusion 533 of the first driving cam 53. Various rotation angles can be envisioned by changing the positions of the cam recesses 553 thereon.

The second driven cam 56 is a cam member interposed between the second driving cam 54 and the elastic member 57. Cam 56 faces the second driving cam 54, for creating a rotating cam motion. The second driven cam 56 is hollow. One cam surface 561 of the second driven cam 56 faces the second driving cam 54, while the other cam surface 552 of the second driven cam 56 faces the elastic member 57. The second driven cam 56 is formed into a hollow cylinder and the hinge shaft 52 is inserted into the second driven cam 56. Thus, along with rotation of the second driving cam 54, the second driven cam 56 moves back and forth in a linear reciprocal motion along the length of the hinge shaft 52. Cam recesses 563 are formed on the one cam surface 561 of the second driven cam 56 and the recesses 562 form a rotating or a cam motion with the single cam protrusion 541 of the second driving cam 54. Various rotation angles can be provided by altering the positions of the cam recesses 563.

Referring to FIGS. 10 and 11, when the components of the hinge device are secured in the hinge housing 51 by fastener, for example, the E-ring 59, the first and second driven cams 55 and 56 are disposed between the first and second driving cams 53 and 54, and cams 55 and 56 in close contact by the elastic member 57, and the first driving cam 53 being disposed outside the hinge housing 51.

With reference to FIGS. 13A to 13D, operations of the hinge device will be described in great detail. FIG. 13A illustrates an operation of the hinge device when the portable terminal is closed, that is, when the second housing of the portable terminal (illustrated in FIGS. 1, 2 and 3), and the first and second driving cams 53 and 54 are at a rotation angle of 0°. When the second housing rotates by 60° in the position shown in FIG. 13A, the first and second driving cams 53 and 54 simultaneously rotate together, and this position places the hinge device in the position illustrated in FIG. 13B. In addition, the single cam protrusions 533 and 541 of the first and second driving cams 53 and 54 move to adjacent cam recesses of the first and second driven cam 55 and 56 and then are fully within in the selected cam recesses of the first and second driven cams 55 and 56. Thus, a stopping force is connected to the second housing at the angle of about 60°, and forms the second housing in a stationary position as shown.

When the second housing is further rotated by 120° in the position of FIG. 13B, and the hinge device illustrated in FIG. 13C is rotated from the position of FIG. 13A by about 180°. The single cam protrusions 533 and 541 of the first and second driving cams 53 and 54 are fully within cam recesses being opposite to the cam recesses of the first and second driven cams 55 and 56 and as illustrated in FIG. 13A. If the first and second driving cams 43 and 44 further rotate by 40° in the position of FIG. 13C, and the hinge device is placed in the position illustrated in FIG. 13D then the hinge device illustrated in FIG. 13D is an about 220-degree rotated version of the hinge device illustrated in FIG. 13A. In this position, the single cam protrusions 533 and 541 of the first and second driving cams 53 and 54 are fully in cam recesses of the first and second driven cams 55 and 56. The first and second driven cams 55 and 56 move back and forth in a reciprocal motion along the hinge axis A and the elastic member 57 is compressed or pulled, according to rotation of the first and second driving cams 53 and 54.

A stopping force may be provided to the second housing during rotation of the second housing at various angles and depending on the positions of the single cam protrusions 533 and 541 of the first and second driving cams 53 and 54 (or the positions of the cam recesses 553 and 563 of the first and second driven cam 55 and 56). During a cam motion created in the operations of the hinge device, the first and second driving cams 53 and 54 are symmetrically disposed with respect to the first and second driven cams 55 and 56. In this manner, four cam members 53, 54, 55 and 56 form the rotating or the cam motion. Thus, the cam members 53, 54, 55 and 56 can stably operate during the lifetime of the hinge device, and instability of the cam motion can be compensated for increase durability.

The hinge device 50 may provide a stopping force to the second housing at various rotation angles, for example, 0° (closed state) and 180°, at 0°, 60°, and 180°, at 0°, 70°, and 210°, or at 0°, 60°, 180°, and 220° according to the positions of the cam protrusions 533 and 541 and the cam recesses 553 and 563. The stopping force may be provided to the second housing at more various rotation angles and this may be accomplished by changing the positions of the cam protrusions 533 and 541 and the cam recesses 553 and 563.

Figure 14:
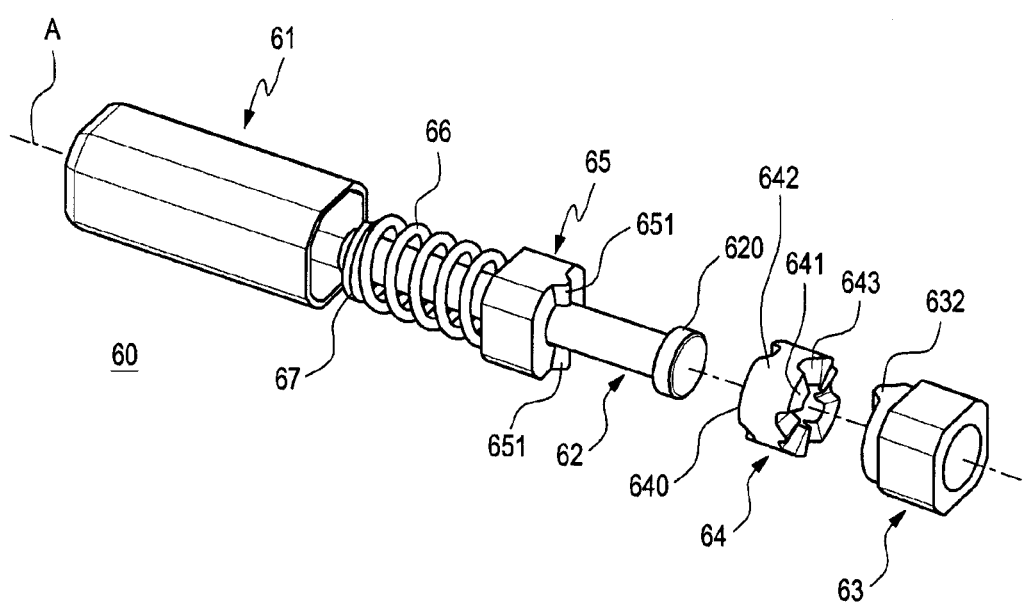
FIG. 14 is an exploded perspective view of a hinge device according to another embodiment of the present disclosure.

With reference to FIGS. 14 to 18B, the configuration of a hinge device 60 for a portable terminal according to another embodiment of the present disclosure will be described in detail. Referring to FIGS. 14, 15 and 16, the hinge device 60 includes a hinge housing 61, and a hinge shaft 62, and a cam member having two or more cams (a driving cam and first and second driven cams) 63, 64 and 65, and also having an elastic member 66.

The hinge housing 61 forms a part of the hinge shaft 62 (excluding an area inserted into the driving cam 63), and a part of the cam portion (the first and second driven cams) 64 and 65, and also has the elastic member 66 along the hinge axis A. With these components accommodated in the hinge housing 61, the elastic member 66 is compressed or pulled within the hinge housing 61, and the first driven cam 64 is shown through which the hinge shaft 62 and is inserted and also moves back and forth in a linear reciprocal motion or rotates, along with rotation of the later-described driving cam 63. The second driven cam 65 moves back and forth in a linear reciprocal motion along the hinge shaft 62 along with the rotation of the driving cam 63.

The hinge device 60 is different from the hinge device 40 in that a pair of cam protrusions 632 is formed on a cam surface of the driving cam 63. The first driven cam 64 moves back and forth along the hinge shaft 62 or rotates upon the hinge shaft 62, according to a rotation area of the driving cam 63. This is possible because cam recesses are asymmetrically formed on both cam surfaces of the first driven cam 64. The cam motion will be described later in great detail.

The hinge shaft 62 is inserted into the driving cam 63 and is inserted into the first and second driven cams 64 and 65, and the elastic member 66. The hinge shaft 62 is cylindrical shaped. The hinge shaft 62 is provided, at an end thereof, with an engagement portion 620. This portion 620 is for securing the driving cam 63 in the hinge housing and, at the other end thereof, with a fastening groove (not shown) for engaging with a fastener such as an E-ring 67.

The elastic member 66 fits around the hinge shaft 62 and is shown for applying a force to bring the driving cam 63 into contact with the first and second driven cams 64 and 65 and thus enabling a cam rotating motion. One end of the elastic member 66 contacts one side surface of the hinge housing 61, whereas the end of the elastic member 66 contacts the second driven cam 65. The elastic member 66 is compressed or pulled inside the hinge housing 61. Elastic member 66 is in contact and depends from the rotating cam motion of the cam member. The elastic member 66 is preferably a compressed coil spring.

The cam member includes the driving cam 63 and the first and second driven cams 64 and 65. The driving cam 63 refers to a cam member that rotates along with rotation of the second housing. The first and second driven cams 64 and 65 refer to cam members that move together during rotation of the driving cam 63. Compared to the driving cam 63 that rotates only and the second driven cam 64 and that makes a linear motion only, the first driven cam 65 makes both a linear reciprocal motion and a rotational motion.

Referring to FIGS. 14 and 17A, the driving cam 63 is an outermost cam member, which is secured to the engagement portion 620 of the hinge shaft 62. As the driving cam 63 is fixed to the second housing 20 and as illustrated in FIG. 3 and being outside the hinge housing 61 as illustrated in FIGS. 15 and 16, the driving cam 63 rotates along with rotation of the second housing. The driving cam 63 is hollow and the engagement portion 620 of the hinge shaft 62 is inserted into the inner space of the driving cam 63.

The driving cam 63 includes a cam body 630 and a hollow portion 631, which may protrude from one surface of the cam body 630 along the hinge axis A. The cam body 630 and the hollow portion 631 are integrally formed relative to one another. A pair of cam protrusions 632 is both formed on one surface of the hollow portion 631 and may face the first driven cam 64. The cam protrusions 632 are shaped into any predetermined shape and may extend from the outer circumference toward the center on the one surface of the hollow portion 631. The cam protrusions 632 symmetrically face each other with respect to the hinge axis A.

Referring to FIGS. 14 and 17B, the first driven cam 64 have a cam body 642 with first and second cam surfaces 640 and 641. The first driven cam 64 moves back and forth linearly along with rotation of the driving cam 63 and rotates together with the driving cam 63 at a predetermined angle or larger. The first driven cam 64 is hollow. One cam surface 641 of the first driven cam 64 faces the driving cam 63 is in close contact with the driving cam 63, and while the other cam surface 640 of the first driven cam 64 faces the second driven cam 65. As the hollow cylinder first driven cam 64 moves, the hinge shaft 62 is inserted into the first driven cam 64. Thus, along with rotation of the driving cam 63, the first driven cam 64 moves back and forth in a linear reciprocal motion along the length of the hinge shaft 62 or rotates. First cam recesses 643 are formed on the one cam surface 641 of the first driven cam 64 to create a rotating motion with the cam protrusions 632 of the driving cam 63. Second cam recesses 644 are formed on the other cam surface 640 of the first driven cam 64 to create a cam motion with a pair of cam protrusions 651 of the second driven cam 65. The first and second cam recesses 643 and 644 are formed asymmetrically at different positions. The reason for forming the first and second cam recesses 643 and 644 at different positions is to allow the first driven cam 64 to form a stepwise cam motion with the driving cam 63. Changing the positions of the first and second cam recesses 643 and 644 changes the cam motion with the driving cam 63 and as a result, the stopping angles of the second housing during rotation of the second housing are also changed.

Referring to FIGS. 15 and 16, when the components of the hinge device are connected in the hinge housing 61 by a fastener, for example, the E-ring 67, and the driving cam 63 is brought into close contact with the first and second driven cams 64 and 65 by an elastic member 66. The driving cam 63 is disposed outside the hinge housing 61.

Figure 18A:
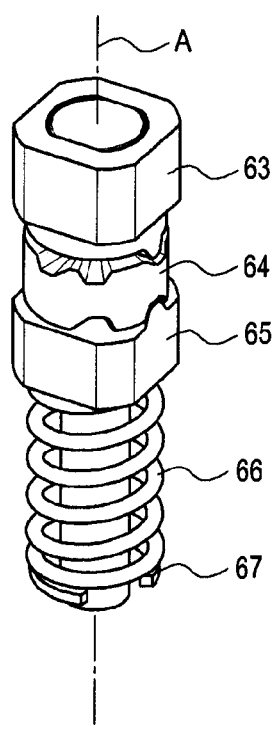
FIG. 18A is a perspective view illustrating an operation of the hinge device illustrated in FIG. 14, when the second housing is at a rotation angle of 0°.

With reference to FIGS. 18A to 18D, operations of the hinge device will be described. FIG. 18A illustrates an operation of the hinge device when the portable terminal is closed, that is, when the second housing of the portable terminal (illustrated in FIGS. 1, 2 and 3), and the driving cam 63 is at a rotation angle of 0°. In the position illustrated in FIG. 18A, the cam protrusions 632 of the driving cam 63 contained in cam recesses 643 on the one cam surface 641 of the first driven cam 64. The cam protrusions 651 of the second driven cam 65 are in cam recesses 644 on the cam surface 640 of the first driven cam 64. The cam protrusions 632 of the driving cam 63 are located close to the cam protrusions 651 of the second driven cam 65, which are shown as facing the cam protrusions 651.

Figure 18B:
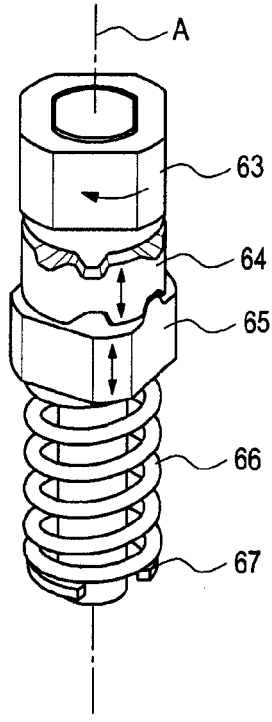
FIG. 18B is a perspective view illustrating an operation of the hinge device illustrated in FIG. 14, and when the second housing is at a rotation angle of 60°.

When the second housing rotates by 60° in the closed position of FIG. 18A, the driving cam 63 rotates placing the hinge device in the position as illustrated in FIG. 18B. As the driving cam 63 rotates, the first and second driven cams 64 and 64 recede and then advance together as illustrated in FIG. 18B. The cam protrusions 632 of the driving cam 63 move to adjacent cam recesses 643 of the first driven cam 64, while the cam protrusions 651 of the second driven cam 65 remain in cam recesses 644 of the first driven cam 64.

When the second housing is rotated by 120° in the state of FIG. 18B, the driving cam 63 also rotates by 120°. The first driven cam 64 rotates along with the rotation of the driving cam 64, and the second driven cam 65 only moves back and forth in a linear reciprocal motion. Rotation of the first driven cam 64 is sufficient and an engagement force between the cam protrusions 632 and the cam recesses 643 is relatively larger than an engagement force between the cam protrusions 651 and the cam recesses 644.

Figure 18C:
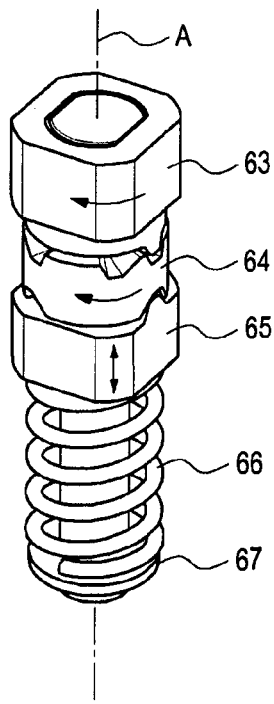
FIG. 18C is a perspective view illustrating an operation of the hinge device illustrated in FIG. 14, and when the second housing is at a rotation angle of 180°.

The hinge device illustrated in FIG. 18C is rotated from the position of FIG. 18A by about 180°. Since the driving cam 63 has rotated together with the first driven cam 64, and the cam protrusions 632 of the driving cam 63 are engaged with the cam recesses 643 on an surface of the first driven cam 64, then the cam protrusions 651 of the second driven cam 65 are in cam recesses 644 on the other surface of the first driven cam 64. When the hinge device is placed in the position illustrated in FIG. 18C, the cam protrusions 632 of the driving cam 63 are again close to the cam protrusions 651 of the second driven cam 65.

Figure 18D:
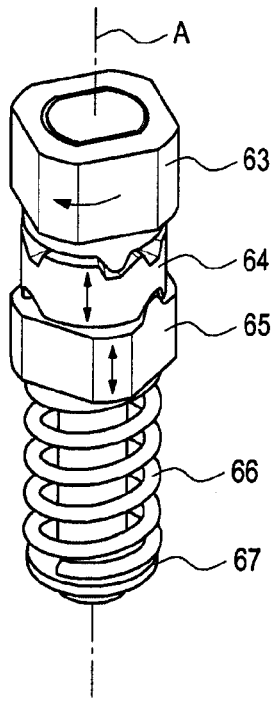
FIG. 18D is a perspective view illustrating an operation of the hinge device illustrated in FIG. 14, and when the second housing is at a rotation angle of 220°.

If the driving cam 63 further rotates by 40° in the position of FIG. 18C, the hinge device is placed in the position as illustrated in FIG. 18D. The hinge device shown in FIG. 18D is an about 220-degree rotated manner of the hinge device illustrated in FIG. 18A. In this position, the first and second driven cams 64 and 65 only move back and forth in a reciprocal motion during rotation of the driving cam 63. That is, the first and second driven cams 64 and 65 recede and advance along with the rotation of the driving cam 63.

As stated before, a stopping force may be provided to the second housing during rotation of the second housing at various angles depending on the positions of the pair of cam protrusions 632 of the driving cam 63, and the positions of the first and second cam recesses 643 and 644 of the first driven cam 64, or by the positions of the second driven cam protrusions 651.

The hinge device 60 may provide a stopping force to the second housing at predetermined rotation angles and according to one or more positions of the cam protrusions 632 and the cam recesses 643 and 644, for example, at 0° (closed state) and 180°, at 0°, 60°, and 180°, at 0°, 70°, and 210°, or at 0°, 60°, 180°, and 220°. The stopping force may be provided to the second housing by changing the positions of the cam protrusions 632 and the cam recesses 643 and 644.

With reference to FIGS. 19 to 23C, the configuration of a hinge device 70 for a portable terminal according to another embodiment of the present disclosure will be described. The hinge device 70 is similar to the embodiment illustrated in FIG. 9 in terms of configuration except for the structures of cam portions.

Figure 19:
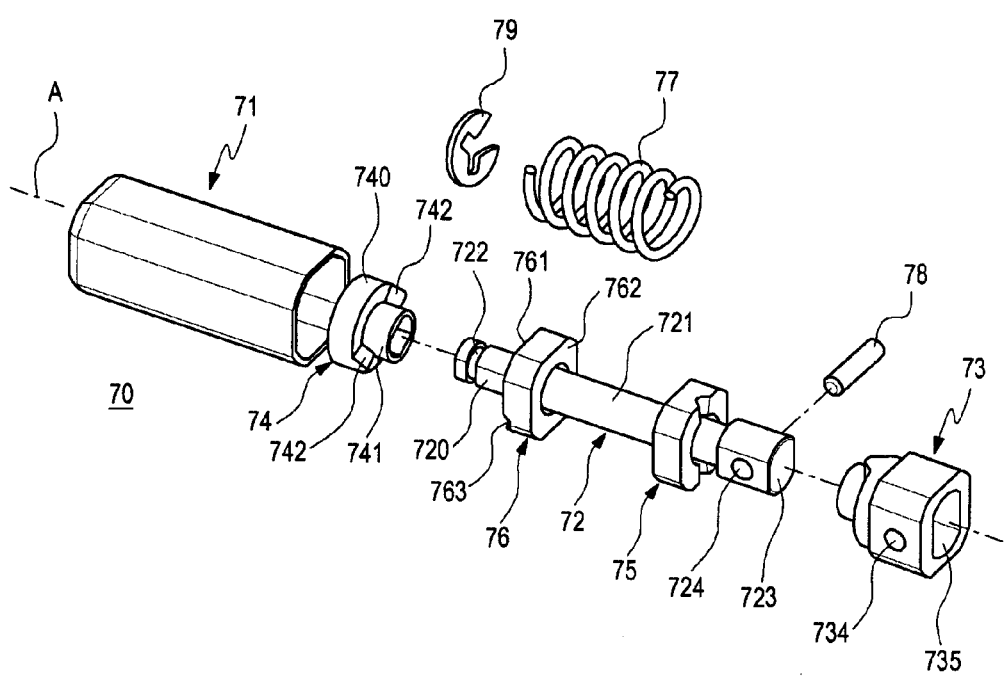
FIG. 19 is an exploded perspective view of a hinge device according to another embodiment of the present disclosure.

Referring to FIGS. 19, 20 and 21, the hinge device 70 includes a hinge housing 71, a hinge shaft 72, and cam portions including three or more cams (first and second driving cams and first and second driven cams) 73, 74, 75 and 76, and an elastic member 77. More specifically, the hinge device 70 has a first cam portion at one side of the elastic member 77 and a second cam portion at the other side of the elastic member 77. The first and second cam portions are disposed opposite relative to one another with respect to the elastic member 77. The first cam portion includes the first driving cam 73 and the first driven cam 75. The second cam portion also has a second driving cam 74 and the second driven cam 76.

The hinge housing 71 forms a part of the hinge shaft 72, and includes the second driving cam 74, and the first and second driven cams 75 and 76, and the elastic member 77. The elastic member 77 is compressed or pulled within the hinge housing 71 and the second driving cam 74 rotates together with the first driving cam 73. The first and second driven cams 75 and 76 move back and forth in a linear reciprocal motion along the hinge shaft 72 along with the rotation of the first and second driving cams 73 and 74.

The hinge shaft 72 is inserted into the first and second driving cams 73 and 74, and the first and second driven cams 75 and 76, and the elastic member 77. The hinge shaft 72 is divided into two portions 720 and 721. The second driving cam 74 is positioned roughly in the one area 720 of the hinge shaft 72, and the second driven cam 76, and the elastic member 77, and the first driven cam 75, and the first driving cam 73 are positioned roughly in the other area 721 of the hinge shaft 72. A fastening groove 722 is formed at one end of the one area 720 of the hinge shaft 72. Groove is for engaging with a fastener such as an E-ring 79. One area 720 of the hinge shaft 72 is cut into a D shape along its outer circumference. The other area 721 of the hinge shaft 52 is cylindrical. A D-cut portion and a hole 724 through which a locking pin 78 is inserted are formed at the other end 723 of the other area 721 to which the first driving cam 73 is fixed.

The elastic member 77 fits around the other area 721 of the hinge shaft 72, and is for providing a force to bring the first and second driving cams 73 and 74 into close contact with the first and second driven cams 75 and 76 and thus enabling a cam rotating motion. One end of the elastic member 77 contacts one side surface of the second driven cam 76, and whereas the other end of the elastic member 77 contacts the first driven cam 75. Fitting around the other area 721 of the hinge shaft 72, the elastic member 77 is compressed or pulled inside the hinge housing 71. The elastic member 77 preferably a compressed coil spring moves relative rotating to the cam motion of the cam members.

The first cam member includes the first driving cam 73 and the first driven cam 75 and the second cam member has the second driving cam 74 and the second driven cam 76. The first and second driving cams 73 and 74 refer to cams that rotate along with rotation of the second housing illustrated in FIGS. 1, 2 and 3. The first and second driven cams 75 and 76 refer to cams that move back and forth along the hinge shaft 72 in rotation to the first and second driving cams 73 and 74.

Referring to FIGS. 19 and 22A, the first driving cam 73 is fixed to the other end 723 of the hinge shaft 72 by a locking device. As the first driving cam 73 is fixed to the second housing 20 illustrated in FIG. 3 outside the hinge housing 71, the first driving cam 73 rotates along with rotation of the second housing. The first driving cam 73 is hollow and the other end 723 of the hinge shaft 72 is inserted into the inner space 735 of the first driving cam 73. As stated, the first driving cam 73 is connected to the other end 723 of the hinge shaft 72 by the locking device. The locking device includes the locking pin 78, a first locking opening 734 formed into the first driving cam 73. Opening is through which the locking pin 78 is inserted. Locking device also has a second locking opening 724, which is located at the other end 723 of the hinge shaft 72, and through which the locking pin 78 is inserted. The two locking openings 734 and 724 are open in perpendicular fashion to the hinge axis A. When the locking pin 78 is inserted into the two locking openings 734 and 724, the first driving cam 73 is fixed to the other end 723 of the hinge shaft 72.

The first driving cam 73 includes a cam body 730, and a first hollow portion 731, which is shown as protruding from one surface of the cam body 730 along the hinge axis A. Cam 73 also has a second hollow portion 732 protruding from the first hollow portion 731 along the hinge axis A and having a smaller diameter than the first hollow portion 731. The cam body 730, the first hollow portion 731, and the second hollow portion 732 are integrally formed relative to one another. The second hollow portion 732 is arranged relative to first hollow portion 731. Cam protrusion 733 are formed on one surface of the first hollow portion 731 and face the first driven cam 75, and are for creating a rotating motion. The cam protrusions 733 extend from the outer circumference toward the center on the one surface of the first hollow portion 731 so that the cam protrusions 733 meet the outer circumferential surface of the second hollow portion 732.

The second driving cam 74 includes a cam body 740 and a hollow portion 741 extended from one surface of the cam body 740 along the hinge axis A. Along with rotation of the second housing, the second driving cam 74 rotates with the first driving cam 73. The second driving cam 74 is fixed in the one area 720 of the hinge shaft 72 and has an inner space shaped to correspond or mate with the one area 720 of the hinge shaft 72. That is, with the one area 720 of the hinge shaft 72 inserted into the second driving cam 74, then the second driving cam 74 rotates along with rotation of the hinge shaft 72, and in contact with one side surface of the hinge housing. Cam protrusions 742 are formed on the one surface of the cam body 740 of the second driving cam 74. The cam protrusions 742 have the same shape as the cam protrusions 733 of the first driving cam 73, and may be made to extend from the outer circumference of the cam body 740 toward the center of the cam body 740. The cam protrusions 741 of the second driving cam 74 make the similar rotating motion together with the cam protrusions 733, facing the cam protrusions 733.

Referring to FIGS. 19 and 22B, the first and second driven cams 75 and 76 are cam members disposed between the first and second driving cams 73 and 74 and for creating a rotating motion with the first and second driving cams 73 and 74.

The first driven cam 75 is a cam member disposed between the first driving cam 73 and the elastic member 77, and are facing the first driving cam 73, for creating a rotating motion. The first driven cam 75 is hollow. One cam surface 751 of the first driven cam 75 faces the first driving cam 73, while the other cam surface 752 of the first driven cam 75 faces the elastic member 77. The hinge shaft 72 is inserted into the first driven cam 75. Thus, along with rotation of the first driving cams 73, the first driven cam 75 moves back and forth in a linear reciprocal motion along the length of the hinge shaft 72. Recesses 753 are formed in pairs on the one cam surface 751 of the first driven cam 75 to create a rotating motion with the pair of cam protrusions 733 of the first driving cam 73. Various rotation angles can be provided.

The second driven cam 76 is a cam member disposed between the second driving cam 74 and the elastic member 77, and which is arranged facing the second driving cam 74, and for creating a rotating motion. The second driven cam 76 is hollow. One cam surface 761 of the second driven cam 76 faces the second driving cam 74, while the other cam surface 762 of the second driven cam 76 faces the elastic member 757. The hinge shaft 72 is inserted into the second driven cam 76. Thus, along with rotation of the second driving cams 74, the second driven cam 76 moves back and forth in a linear reciprocal motion along the length of the hinge shaft 72. Recesses 763 are formed in pairs on the one cam surface 761 of the second driven cam 76 to create a rotating motion with the cam protrusions 742 of the second driving cam 74.

Referring to FIGS. 20 and 21, when the components of the hinge device are secured in the hinge housing (not shown) by means of the fastener, for example, the E-ring 79, the first and second driven cams 75 and 76 are disposed between the first and second driving cams 73 and 74, and in contact by the elastic member 77. The first driving cam 73 is disposed outside the hinge housing.

With reference to FIGS. 23A, 23B and 23C, operations of the hinge device will be described in great detail. FIG. 23A illustrates an operation of the hinge device when the access terminal is closed, that is, when the second housing of the portable terminal (illustrated in FIGS. 1, 2 and 3), specifically the first and second driving cams 73 and 74 are at a rotation angle of 0°. The cam protrusions 733 are in cam recesses 753 and the cam protrusions 742 are in a position from cam protrusions 763.

When the second housing rotates by 130° as illustrated in FIG. 23A, the hinge device is placed in the position illustrated in FIG. 23B. The cam protrusions 733 are removed from the cam recesses 753 and the cam protrusions 742 are in the cam recesses 763. The first and second driving cams 73 and 74 rotate together, and the first and second driven cams 75 and 76 move back and forth in a linear reciprocal motion, and the elastic member 77 is compressed.

When the second housing is further rotated by 50°, the hinge device is placed in the position illustrated in FIG. 23C. The hinge device of FIG. 23C is rotated from the position of FIG. 23A by about 180° and thus in the state of FIG. 23A.

In the above operations of the hinge device, the first and second driven cams 75 and 76 move back and forth in a linear reciprocal motion along the hinge axis A and the elastic member 77 is compressed, according to rotation of the first and second driving cams 73 and 74.

As stated before, a stopping force may be provided to the second housing during rotation of the second housing at various angles. These may depend on the positions of the cam protrusions 733 and 742 and by the first and second driving cams 73 and 74 or by the positions of the cam recesses 753 and 763 of the first and second driven cam 75 and 76. During a cam motion created in the operations of the hinge device, the first and second driving cams 73 and 74 are symmetrically disposed with respect to the first and second driven cams 75 and 76, and these four cam members 73, 74, 75 and 76 make the cam motion. Thus, the cam members 73, 74, 75 and 76 can stably operate and the durability of the hinge device can be increased.

The hinge device 70 may provide a stopping force to the second housing at various rotation angles, for example, at 0° (closed state), 60°, and 180° according to the positions of the cam protrusions 733 and 742 and the cam recesses 753 and 763. In addition, the stopping force may be provided to the second housing at more various rotation angles (between 0° and 180°) by changing the positions of the cam protrusions 733 and 742 and the cam recesses 753 and 763.

Figure 24:
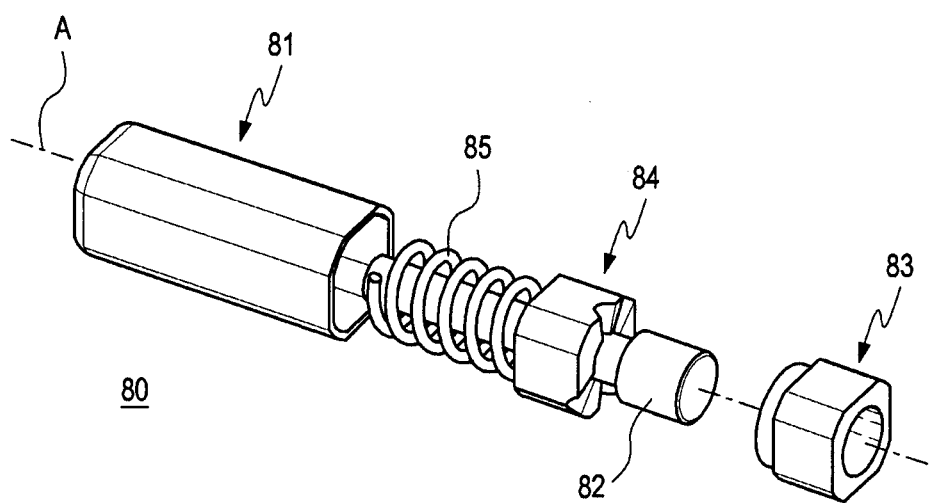
FIG. 24 is an exploded perspective view of a hinge device according to a further embodiment of the present disclosure.
Figure 25:
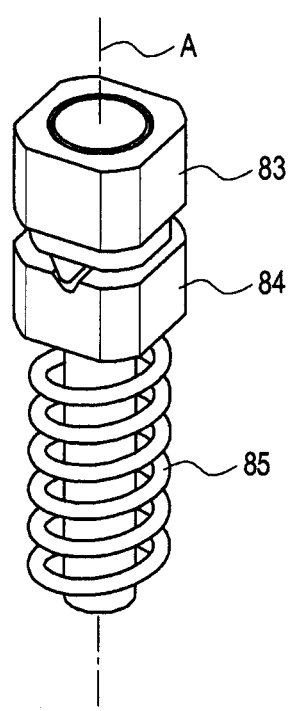
FIG. 25 is an assembled perspective view of the hinge device illustrated in FIG. 24, and when the hinge device does not include a hinge housing.
Figure 26:
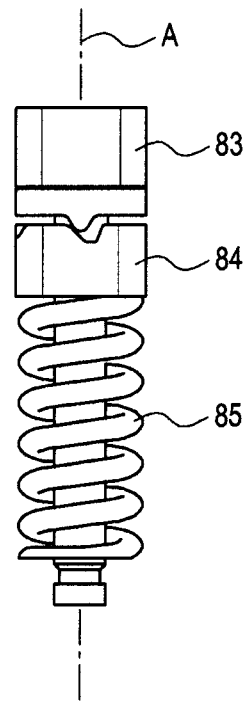
FIG. 26 is a front view of the hinge device illustrated in FIG. 25.

With reference to FIGS. 24 to 27B, the configuration of a hinge device 80 for a portable terminal according to a further embodiment of the present disclosure will be described in detail. Referring to FIGS. 24, 25 and 26, the hinge device 80 includes a hinge housing 81, a hinge shaft 82, a driving cam 83, and a driven cam 84, and an elastic member 85.

The hinge housing 81 has the hinge shaft 82, the driven cam 84, and the elastic member 85 along the hinge axis A. The driving cam 83 is disposed outside the hinge housing 81. With these components accommodated in the hinge housing 81, the elastic member 85 is compressed or pulled within the hinge housing 81 and the driven cam 84 moves back and forth in a linear reciprocal motion, along with rotation of the driving cam 83.

The hinge shaft 82 is inserted into the driving cam 83, the driven cam 84, and the elastic member 85.

The elastic member 85 fits around the hinge shaft 82, for supplying a force to bring the driving cam 83 into close contact with the driven cam 84 and thus enabling a cam rotating motion. One end of the elastic member 85 contacts one side surface of the hinge housing 81, and the other end of the elastic member 85 contacts the driven cam 84. The elastic member 85 preferably a compressed coil spring is compressed or pulled inside the hinge housing 81 based on the cam motion.

The driving cam 83 is a cam that rotates along with rotation of the second housing, and the driven cam 84 is a cam that moves back and forth in a linear reciprocal motion along the hinge shaft 82 depending on rotation of the driving cam 83.

Figure 27A:
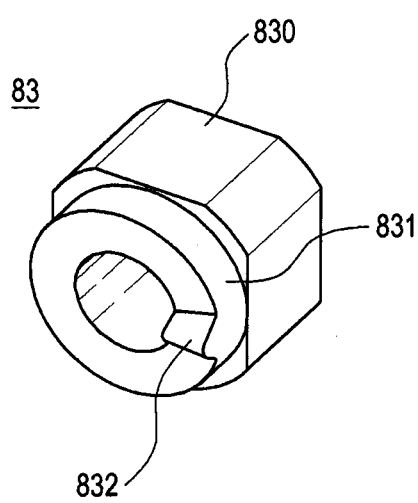
FIG. 27A is a perspective view of a driving cam in the hinge device as illustrated in FIG. 24.

Referring to FIGS. 24 and 27A, the driving cam 83 is hollow and the other end of the hinge shaft 82 is inserted into the inner space of the driving cam 83. The driving cam 83 has a cam body 830 and a hollow portion 831 protruding from one surface of the cam body 830 along the hinge axis A. The cam body 830 and the hollow portion 831 are integrally formed relative to one another. A single cam protrusion 832 is formed on one surface of the hollow portion 831 and faces the driven cam 84, and is for making a cam motion. The cam protrusion 832 extends from the outer circumference toward the center on the one surface of the hollow portion 831.

Figure 27B:
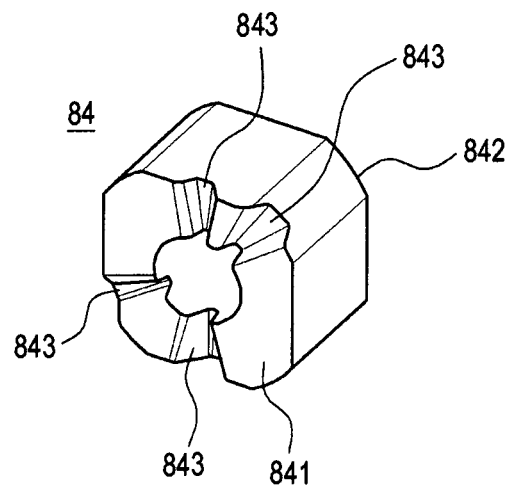
FIG. 27B is a perspective view of a driven cam in the hinge device as illustrated in FIG. 24.

Referring to FIGS. 24 and 27B, the driven cam 84 is a hollow cam member that makes a cam rotating motion and which faces the driving cam 83. One cam surface 841 of the driven cam 84 faces the driving cam 83 in close contact, while the other cam surface 842 of the driven cam 84 faces the elastic member 85. Along with rotation of the driving cam 83, the driven cam 84 moves back and forth in a linear reciprocal motion along the length of the hinge shaft 82. Recesses 843 are formed on the one cam surface 841 of the driven cam 84 to create a cam motion with the cam protrusion 832 of the driving cam 83. The single cam protrusion 832 is accommodated in or removed in the cam recesses 843. If the single cam protrusion 832 is fully accommodated in a cam recess 843, then a stopping force is provided to the second housing. The single cam protrusion 832 and the cam recesses 843 may be formed at other positions than shown in FIGS. 27A and 27B.

Referring to FIGS. 25 and 26, the driven cam 84 is brought into close contact with the driving cam 83 by the elastic member 85. The driven cam 84 advances or recedes and the elastic member 85 is compressed or pulled, along with rotation of the driving cam 83.

The hinge device 80 may provide a stopping force to the second housing at various rotation angles according to the positions of the cam protrusion 832 and the cam recesses 843. For example, a stopping force may be provided to the second housing at 0° (closed state) and 180°, at 0°, 60°, and 180°, at 0°, 70°, and 210°, or at 0°, 60°, 180°, and 220°. The stopping force may be provided to the second housing at more various rotation angles between 0° and 360° by changing the positions of the cam protrusion 832 and the cam recesses 843 as described above.

As is apparent from the above description of the present disclosure, the hinge devices of the present disclosure operate more stably despite limitlessly repeated opening and closing operations of the portable terminal. Especially, the hinge devices have an increased lifetime, thereby increasing the quality of the portable terminal.

While the present disclosure has been particularly shown and described with reference to embodiments thereof, it will be understood by those of ordinary skill in the art that various changes in form and details may be made therein without departing from the spirit and scope of the present disclosure as defined by the following claims.

What is claimed is:

1. A hinge device adapted for a portable terminal, comprising:
  a hinge housing;
  a hinge shaft disposed in the hinge housing, the hinge shaft having a first end and a second end;

a first cam member disposed on the first end of the hinge shaft, the first cam member comprising a first driving element fixed on the hinge shaft by a locking device and a first driven element facing the first driving element, the first driven element being configured to perform a linear reciprocal motion along the hinge shaft when the first driving element is rotated;

a second cam member disposed on the second end of the hinge shaft, the second cam member comprising a second driving element configured to rotate with the first driving element and a second driven element facing the second driving element, the second driven element being configured to perform a linear reciprocal motion along the hinge shaft when the second driving element is rotated; and an elastic member fit around the hinge shaft and disposed between the first and second cam members.

2. The hinge device of claim 1, wherein the first and second cam members are symmetric with respect to the elastic member.

3. The hinge device of claim 1, wherein the first driven element includes a plurality of first cam recesses on a surface of the first driven element that faces the first driving element, and the second driven element includes a plurality of second cam recesses on a surface of the second driven element that faces the second driving element.

4. The hinge device of claim 3, wherein the first cam recesses and the second cam recesses are symmetrical.

5. The hinge device of claim 3, wherein:
the first driving element comprises
a first hollow portion extending along a hinge axis,
a second hollow portion extending from the first hollow portion along the hinge axis, wherein the second hollow portion has a smaller diameter than the first hollow portion; and
the second driving element comprises
a third
a hollow portion extending along the hinge axis.

6. The hinge device of claim 3, wherein the first driving element comprises a first cam protrusion and the second driving element comprises a second cam protrusion, such that if the portable terminal is in a closed state, the first and second cam protrusions are disposed symmetrically in a first and a second cam recesses, respectively.

7. The hinge device of claim 1, wherein the first driven element has a plurality of first cam recesses being arranged in pairs on a surface of the first driven element facing the first driving element, and the second driven element has a plurality of second cam recesses being arranged in pairs on a surface of the second driven element facing the second driving element.

8. The hinge device of claim 1, wherein:
the first driving element comprises
a first hollow portion extending along a hinge axis,
a second hollow portion extending from the first hollow portion along the hinge axis, and having a smaller diameter than the first hollow portion, and
a pair of first cam protrusions being formed on a surface of the first hollow portion; and
the second driving element comprises
a third hollow portion extending
along the hinge axis, and
a pair of second cam protrusions being formed on a surface of the third hollow portion.

9. The hinge device of claim 1, wherein the locking device comprises:
a first locking opening formed into the first driving element, wherein the first locking opening is transverse to a hinge axis;
a second locking opening formed into the first end of the hinge shaft, the second locking opening being transverse to the hinge axis; and
a locking pin disposed in the first and second locking openings.

* * * * *